Sept. 25, 1928.
C. E. ANDREWS
PROCESS OF PURIFICATION
Filed Feb. 27, 1918
1,685,624
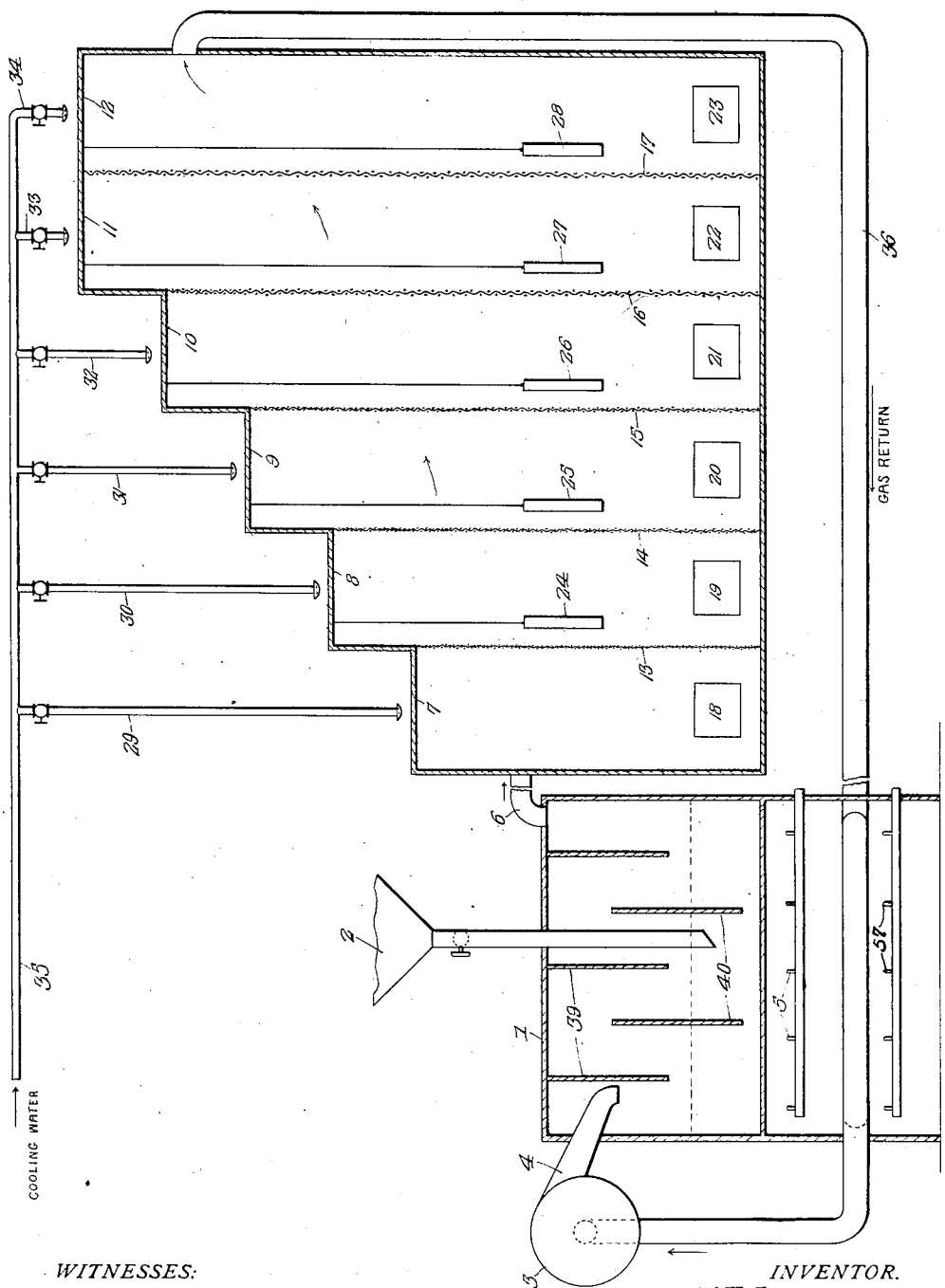

Patented Sept. 25, 1928.

1,685,624

UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

PROCESS OF PURIFICATION.

Application filed February 27, 1918. Serial No. 219,447.

The present invention refers to the purification of normally solid coal tar bodies, by a method involving the fractional sublimation of some one or more constituents of a mixture containing the bodies together with other substances, and the process is, like all sublimation processes, divided into two steps. The first step consists in heating the mixture of materials, preferably in a current of air or inert gas, to serve as a conveying agent for the vapors, and the second step consists in fractionally condensing the vapors to the solid (usually crystalline) state.

In order to more fully explain the nature of the invention, the following examples are given.

*Example 1: Recovery of anthracene from crude anthracene press cake.*—The crude anthracene press cake as ordinarily employed, usually contains, in addition to 30–40% of anthracene, about 60 to 70% of impurities. The principal of these impurities are phenanthrene, methyl anthracene and carbazol. The formulas and principal properties involved in the process are as follows:

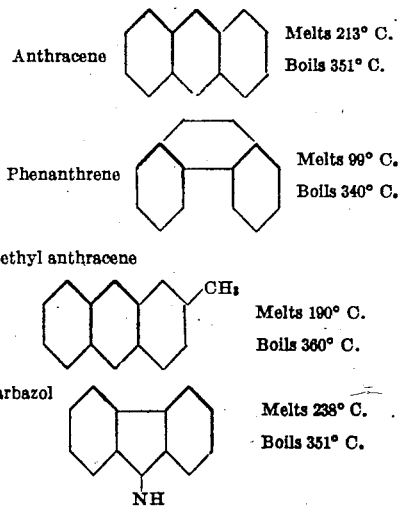

In recovering substantially pure anthracene from this material, it is advisable to heat the material (the crude press cake) in a suitable tank or vessel with a solution of caustic alkali, for example caustic soda (of 80 to 85%), to a temperature of about 100° C. By this operation the carbazol is converted into its sodium salt, in accordance with the following reaction:

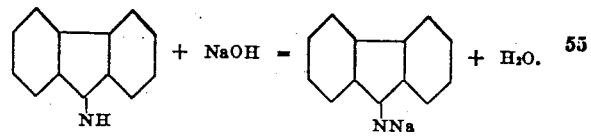

The sodium salt is soluble in water, and can be first dissolved out by adding about two parts of water, agitating the mixture at ordinary temperature or preferably while warm, after which the mixture is subjected to filtration. The sodium salt of carbazol is thereby separated, and the solution may then be acidified if desired to produce carbazol.

The material so treated is then heated in a current of air or inert gas, to a temperature of about 250° C. The air carrying vapors of anthracene, methyl anthracene and phenanthrene is then passed through a fractional condenser, in which the material which separates in the first compartment is largely anthracine, after which methyl anthracene separates, and finally phenanthrene separates. If a rather large number of compartments are used, and the cooling of the gases and vapors is conducted rather slowly, it is possible to produce a fairly sharp separation of the three materials. Any mixtures which are produced may be treated in any convenient manner to separate the constituents thereof.

The precipitated carbazol obtained by addition of acid to the solution of the sodium salt of carbazol may be purified in any suitable manner. In this particular example it would not be feasible to separate the carbazol from the anthracene by fractional sublimation alone, the melting and boiling points of the two being too close together. The process of the above example is not specifically claimed herein, but in my copending application, Serial No. 242,903, filed July 1, 1918.

*Example 2: Separation of phthalic anhydrid from naphthalene.*—A mixture of phthalic anhydrid and naphthalene, produced for example by the partial oxidation of naphthalene, can be purified in various manners. It is of course possible to dissolve the phthalic anhydrid by treating with a solution of caustic soda, thereby forming sodium phthalate in solution, but there are objections to this method. Such a mixture, however, can be readily separated into its ingredients, by fractional sublimation in a current of air or purified chimney gases. The temperature at which the sublimation is effected is preferably about 200° C. The properties of the substances, upon which the operation of the process depends are as follows:

Naphthalene—melting point 80° C., boiling point 218° C.

Phthalic anhydrid—melting point 128° C., boiling point 284° C.

*Example 3: Purification of crude anthraquinon.*—In the oxidation of anthracene for the production of anthraquinon, there is sometimes produced a mixture consisting largely of anthracene and anthraquinon, also frequently containing some small amounts of phenanthrene, phenanthraquinon and methyl anthracene and methyl anthraquinon. The properties of the substances upon which the process depends are as follows:

Anthracene—melting point 213° C.; boiling point 351° C.

Anthraquinon—melting point 285° C., boiling point 382° C.

Phenanthrene—melting point 99° C., boiling point 340° C.

Phenanthraquinon—melting point 198° C., boiling point 360° C.

Methyl anthracene—melting point 190° C., boiling point 360° C.

Methyl anthraquinon—melting point 177° C., sublimes above 360° C.

This purification is preferably effected by treating the mixture, at a temperature of about 300° C., with a current of air or inert gases, and fractionally collecting the sublimate as above described.

*Example 4: Purification of crude naphthalene.*—Crude naphthalene, consisting for example of the fraction of coal tar distilled over between the approximate limits of 180° C. and 300° C. contains in addition to naphthalene, principally alpha methyl naphthalene, which is a liquid boiling at about 240° C. and beta methyl naphthalene which melts at about 32° C. and boils at 241° C. This mixture may be treated by fractional sublimation in order to separate the major portion of the naphthalene from the alpha methyl naphthalene and beta methyl naphthalene, by sublimation at a temperature of about 150° C., in a current of air or other inert gas.

*Example 5: Separation of benzoic and salicylic acids from impurities.*—The properties upon which the operation depends are as follows: Salicylic acid melts at 156° C. and has no boiling point, but decomposes when heated to about 200° C.

Benzoic acid melts at about 120° C. and boils at 250° C.

This mixture of materials can readily be separated by fractional sublimation, employing a current of air or inert gas (preferably air), at a temperature of about 175° C.

The process forming the subject matter of this invention is generally applicable to the treatment of mixtures of organic substances which are essentially solid at ordinary temperature and which are capable of being sublimed without considerable decomposition.

In the operation of the process, the substance having the lowest boiling point will vaporize first from the mixture, whereas the substance having the highest boiling point will tend to remain in the mixture under treatment, particularly when the boiling points of the constituents of the mixture are rather far apart. The process may be operated by driving off from a mixture of two substances, the major part of the more volatile of such substances, while leaving in the mixture, the major part of the less volatile of such substances.

In the above example, air is a suitable gas vehicle, in which to effect the sublimation of most of the substances mentioned, under the temperature conditions specified. In other examples which might be given, air is not a suitable gas vehicle to employ, since many substances would undergo deleterious oxidation, if treated in a current of air, and for such materials I may employ other gas vehicles, such as purified chimney gas, $CO_2$, nitrogen, water gas, hydrogen, natural gas and various others, it of course being understood that the gas to be selected is one which will not injuriously affect the materials under treatment.

Without limiting myself to a specific arrangement of apparatus, I have illustrated in the accompanying drawing a longitudinal section of an apparatus which may conveniently be used in carrying out the process. In said apparatus the material to be separated is placed into a box-like vaporizer 1, provided with a filling funnel 2, or equivalent filling means, and a blast of gas suitable for use as a vehicle is introduced from the centrifugal pump 3 by pipe 4. The receptacle 1 may be heated in any convenient manner, for example by gas burners 5 placed below the same, and the current of gases and liquids produced in the vaporizer 1 may be carried through the pipe 6 into a suitable condensing chamber. This chamber contains a number of compartments of successively increasing height, illustrated from 7 to 12 respectively, and separated by screens of wire gauze 13 to 17, and the successive compartments are provided with a series of doors 18 to 23, inclusive, for removing the crystallized or sublimed matter collected in the several compartments. Elements 24 to 28, inclusive, are flat weights carried upon suitable rods, which weights may be swung out from time to time and allowed to bump against the screens, for the purpose of knocking off the accumulated sublimate. Cooling water may be supplied to the exterior of some one or more, or even all of these compartments by valved pipes 29 to 34, inclusive, fed from pipe 35, for the purpose of separately and independently cooling the several compartments of the condenser in a regulable manner.

The gases leaving the last condenser may be brought back through the pipe 36 to the pump 3, for reintroduction into the system, and if desired, a coil of pipe placed below the receptacle 1 may be heated by means of suitable gas burners 37, to approximately the same temperature as to that at which the material in tank 1 is to be maintained. The tank 1 may be provided with downwardly extending baffles 39, and upwardly extending baffles 40, in order to make the gases follow a tortuous course.

What is claimed is:

1. In the manufacture of phthalic anhydrid, the step of separating phthalic anhydrid from naphthalene by vaporizing, from a mixture containing such two materials, a plurality of normally solid substances into a flowing current of an inert gas, while heating such mixture to a temperature of about 200° C., and successively cooling the resulting gas-vapor mixture to separately crystallize therefrom the vaporous materials.

2. A method of separating condensed benzene-nuclei compounds from oxidation products thereof, which comprises vaporizing into a flowing gas current, at an elevated temperature below the boiling point of the most volatile of the essential ingredients, of the mixture, a part at least of such mixture, and gradually cooling the current of gas containing the vapors whereby the vaporized materials separate in the solid state from such gas current in the inverse order of their volatility.

3. The process which comprises subliming a mixture containing a polynuclear aromatic hydrocarbon and an oxidation product of the same in a hot gas and slowly cooling the mixture in successive stages.

4. The process which comprises subliming a mixture containing a polynuclear aromatic hydrocarbon and an oxidation product of the same in a hot gas, passing the gas containing the mixture into a cooling zone where one of the substances is crystallized and separated and subsequently cooling the gas carrying the remainder of the mixture to a lower temperature.

5. The process which comprises subliming a mixture containing a polynuclear aromatic hydrocarbon and an oxidation product of the same in a hot neutral gas and subjecting the same to fractional condensation.

6. In the manufacture of phthalic anhydrid, the step of separating the phthalic anhydride from napthalene by fractional sublimation at a temperature of about 200° C.

7. A method of separating oxidation products of condensed benzene nuclei hydrocarbons from other materials contained in the oxidation product, which comprises vaporizing into a gas current at a temperature above the melting point of the highest melting ingredient of the mixture a part at least of such mixture, and fractionally condensing into crystals at different locations the ingredients from such gas current in the inverse order of their volatility.

8. The method which comprises volatilizing solid crude oxidation products of solid aromatic hydrocarbons in a current of gas at a temperature above its melting point, and condensing in a series of chambers held at successively decreasing temperatures, the first of said chambers being held at a temperature below the melting point of the highest melting oxidation product.

9. In the separation of napthalene from phthalic anhydride the step of vaporizing into a gas current at about 200° C., a part at least of a mixture of such materials and separately crystallizing at different locations, the several vaporized ingredients.

10. The process of separating phthalic anhydride from the product resulting from the oxidation of naphthalene which comprises heating the said oxidation product in a gas current to a temperature of about 200° C., whereby a portion of said material is vaporized and is carried along in the gas current, slowly cooling the gas current in a plurality of stages to cause separate condensation of the said ingredients at such several stages.

In testimony wherof I affix my signature.

CHESTER E. ANDREWS.